United States Patent
Malkin et al.

(10) Patent No.: US 8,576,067 B2
(45) Date of Patent: Nov. 5, 2013

(54) LOCATION-BASED ACTION TRIGGERING SYSTEM AND METHOD

(75) Inventors: Peter K. Malkin, Ardsley, NY (US); Jacquelyn A. Martino, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/605,770

(22) Filed: Sep. 6, 2012

(65) Prior Publication Data

US 2012/0329481 A1 Dec. 27, 2012

Related U.S. Application Data

(63) Continuation of application No. 12/903,494, filed on Oct. 13, 2010.

(51) Int. Cl.
*G08B 21/00* (2006.01)

(52) U.S. Cl.
USPC ............... 340/539.13; 340/539.11; 455/456.3

(58) Field of Classification Search
USPC ............. 340/573.1, 539.11, 539.13; 701/468, 701/516, 522, 526; 455/456.1
See application file for complete search history.

(56) References Cited

U.S. PATENT DOCUMENTS

| 2006/0061488 A1* | 3/2006 | Dunton .................... 340/988 |
| 2008/0082651 A1* | 4/2008 | Singh et al. ............... 709/224 |
| 2011/0215933 A1* | 9/2011 | Darling et al. ............ 340/573.1 |

OTHER PUBLICATIONS

Bhawalkar, P, et al, Schedule Nanny: Using GPS to Learn the User's Significant Locations, Travel Times and Schedule. Georgia Institute of Technology, Sep. 2, 2004, 7 pages.*

* cited by examiner

*Primary Examiner* — Jeffery Hofsass
(74) *Attorney, Agent, or Firm* — Scully, Scott, Murphy & Presser, P.C.; Louis J. Percello, Esq.

(57) ABSTRACT

A target receiver may receive a location-related specification and a time period-related specification, the time period-related specification specifying time period in which to check for the location-related specification. A location monitor may determine current location-related information. A time period monitor may determine current time-related information. An analyzer may determine whether a pair of the location-related specification and the time-period related specification is satisfied by the current-location information and the current time-related information. The analyzer may further provide notification as to whether the pair of the location-related specification and the time-period related specification is satisfied by the current-location information and the current time-related information.

19 Claims, 2 Drawing Sheets

LOCATION-BASED ACTION TRIGGERING SYSTEM AND METHOD

CROSS REFERENCE TO RELATED APPLICATION

This application is a continuation of U.S. patent application Ser. No. 12/903,494, filed Oct. 13, 2010 the entire content and disclosure of which is incorporated herein by reference.

FIELD

The present application generally relates to computer systems and more particularly to location-based action triggering system and method.

BACKGROUND

Typical alarms and notification are based on a particular time of day or for a particular calendar event. For instance, calendar software on computers, personal digital assistants, cellular phones, smartphones, and the like, an alarm feature that alerts a user when certain time is reached. For instance, a user may insert a meeting data and time into such calendar software, and the calendar software would sound or display a notification when the time for the meeting has come. These types of known software provide notification based on time.

BRIEF SUMMARY

A location-based action triggering may be provided, which generates an action or notification based on location information as well as the time information. An action generating device may be provided, in one aspect, which may include a target receiver operable to receive a location-related specification and a time period-related specification, the time period-related specification specifying time period in which to check for the location-related specification. A location monitor may be operable to determine current location-related information. A time period monitor may be operable to determine current time-related information. An analyzer may be operable to determine whether a pair of the location-related specification and the time-period related specification is satisfied by the current-location information and the current time-related information. The analyzer may be further operable to provide notification as to whether the pair of the location-related specification and the time-period related specification is satisfied by the current-location information and the current time-related information.

A method for location-based action triggering, in one aspect, may include receiving a location-related specification and a time period-related specification, the time period-related specification specifying time period in which to check for the location-related specification. The method may also include determining current location-related information and determining current time-related information. The method may further include determining whether a pair of the location-related specification and the time period-related specification is satisfied by the current location-related information and the current time-related information. The method may yet further include generating a notification in response to determining that the pair of the location-related specification and the time period-related specification is satisfied by the current location-related information and the current time-related information.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system and method are presented that in one embodiment trigger events such as alarms, phone calls, text messages, and others, based on one or more person's location and calendar information. In another embodiment, such events may be trigger based further on user defined rules. For instance, alarms may be needed not only at a particular time of day or for a particular calendar event, but would also be useful if they are based on spatial information such as the current location or a predicated location in a certain amount of time, e.g., where a person will be in fifteen minutes. The present disclosure broadly includes triggering a notification based on time information and location information.

As another example, if a person is traveling home by train and falls asleep, it would be convenient if the person's global positioning system device (GPA)-enabled phone or such device would give the person a wake-up call (or otherwise alert the person) one stop before the person's destination. Although the person could manually set this clock while in transit, such a manual alarm would not account for any transit delays. The present disclosure in one aspect describes a methodology and a system that applies the use of location information to adjust the time of the actual wakeup call, for instance, as in the above example, based on the train's real location with respect to the person's destination.

A method and a system of the present disclosure in one embodiment intersect information for an individual calendar or a group of calendars with information about a single user's location or the location of multiple people in a contact group and/or workgroup, and use that intersection to trigger events, e.g., alarms, phone calls, text messages and others. An example may include an event being set to be triggered if a person is on the train to a specified location during a specified time of the week. In addition, events may be sent to other people, e.g., to notify or provide an estimate of when the person will arrive for a meeting with those other people. Yet another example may be sending an alert for a meeting in another location based on when the person needs to be there. Still yet, the method and system of the present disclosure in one embodiment may provide for the ability to use one or more persons' location in encoding trigger rules.

Figure 1:
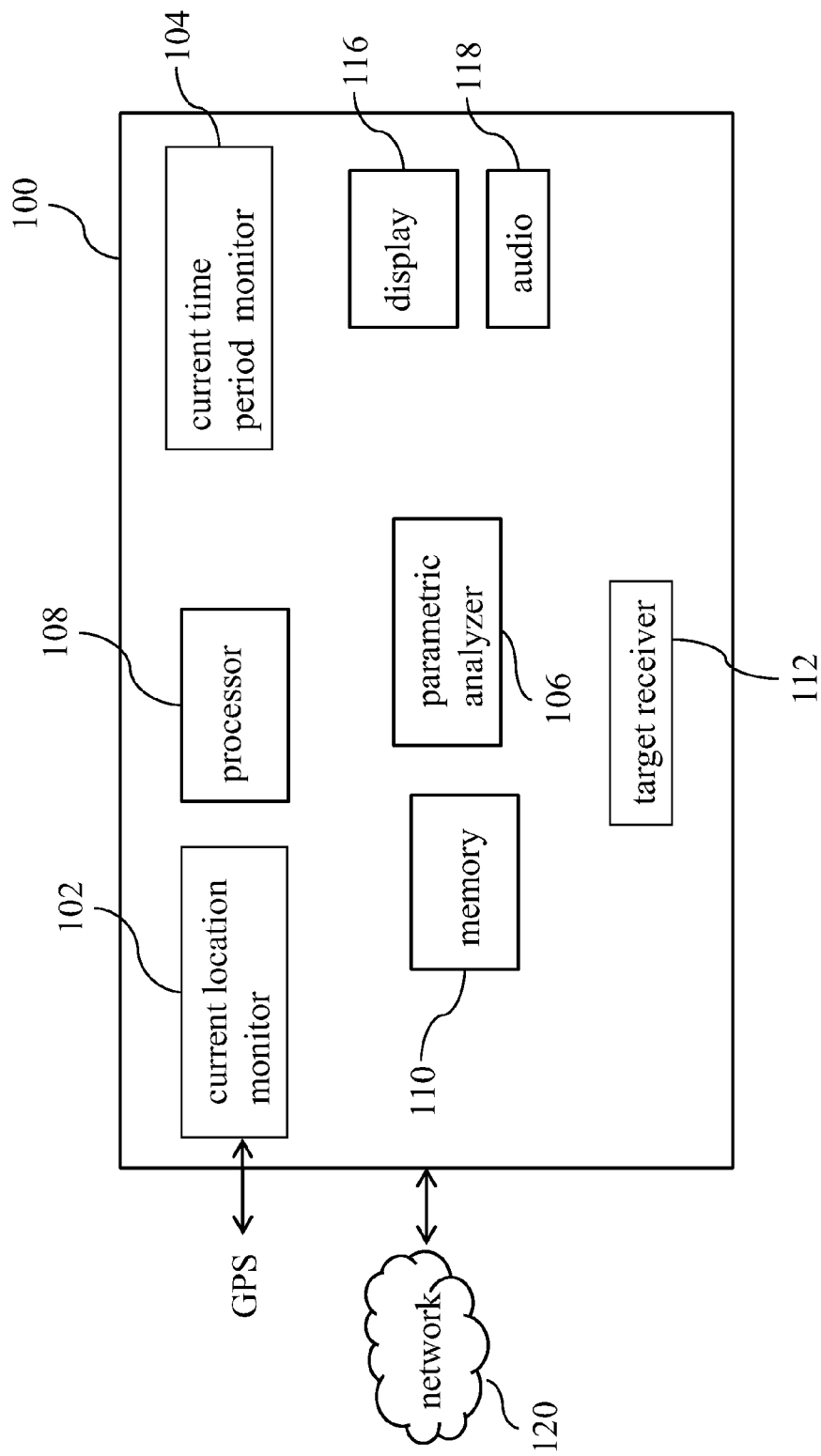
FIG. 1 illustrates an action generating device of the present disclosure in one embodiment.

FIG. 1 illustrates an action generating device 100 of the present disclosure in one embodiment. A target receiver 112 may receive and/or contain specifications of the conditions under which an alarm is to be generated. In the present disclosure in one embodiment, these specifications include:

a location-related specification, and
a time period-related specification.

The location-related specification and a time period-related specification may be specified as an associated pair.

Location-related specifications indicate the position (also referred to as the target position or desired position) of the action generation device and/or one or user of the action generation device and/or the position of one or more other persons, where for example, the device or the user or another person should be located. Examples of such specifications can include:

a particular location, like the Ardsley train station;
the range to a location, e.g., within 100 miles of New York City;
the direction of travel;
the speed of travel (e.g., 100 kph, walking (~3 mph), or flying (>200 mph));
altitude (e.g., on the ground or in the air).

Additional location-related specifications can include parameters, such specifications including:

time to reach a given location, e.g., 10 minutes before reaching the Ardsley train station;
the mode of transportation (e.g., car, train bicycle).

Such information is referred to as parameters or parametric because while they do not directly provide the location information, the information can be used to infer or calculate the location information. For example, in the first example above, the time to reach a given location has a parametric relationship to the location information, i.e., 10 minutes before reaching the target location.

In addition, a location-related specification can also have a user identifier (ID) parameter. This supports the case where one wants an alarm to sound depending on the location of another user. For example, a given employee might only want to be reminded of a department meeting if their manager is in the office at the time and date scheduled for the meeting, the meeting inevitably being delayed. Thus, in this example, the location-related specification would specify a location and an associated user identifier.

The target receiver 112 also obtains (or receives) a time period-related specification, this being the time and/or date on which to check for the given location-related specification. This data can include a time period, a date period, or a combination of a time period and a date period. A time period can include:

a particular time (e.g., 12:00 GMT);
a particular time period (e.g. 9:00 AM through 5:00 PM);
a term mapped to a time period (e.g., "morning," or "after work").

A date period can include:
A particular date (e.g., May 3, 2012);
A particular date range (e.g., Jan. 1, 2012 through Jun. 30, 2012);
A date range (e.g., Monday through Friday, the first Monday of every month, or weekends);
A mapped category of dates (e.g., holidays).

Other expressions of temporal indication are possible.

Similar to the location-related specifications, a given time period specification can be tied to a specified user (e.g., one other than the owner of the action generating device 100). For example, if one specifies that a time period-related specification is bound to user_x, then time periods (including after work and holidays) will be those of user_x. This is useful when one has to coordinate with another with different scheduling, e.g., a student whose "work hours" are the time at school versus a parent whose "work hours" are the time at the parent's given business.

The target receiver 112 may also receive (or obtain) a specification or information about a particular alert to generate when a given pair of location-related and time period-related specification is reached or satisfied. Different types of alerts may be generated based on this information. This would allow for particular alerts to be produced in response to particular location and time period states. Different types of alarms may include, but are not limited, to vibration, ring tone, verbal announcements, etc. Examples may include, but are not limited to, producing a vibration alarm as an alert before the train station is reached, producing verbal announcement "pick up food" as another alert if a person's current position is closer to a restaurant on the way home from work as related to another person's current position.

As shown in FIG. 1, the action generating device 100 also contains a current location monitor 102. This component 102 provides indication of the action generating device's 100 current location-related information and is used by the parametric analyzer 106 (described below) to determine if all of the location-related specifications currently hold (i.e., are true). The information provided by this component 102 may include the current location, latitude, longitude and altitude, as well as the device's 100 direction and speed of travel. Such information can be provided by GPS-based components, like that used in cell phones (e.g., iPhone™) and navigational devices (e.g., TomTom™). Addition to this information, the current location monitor 102 also may return additional navigational information, including:

distance to a particular location (e.g., distance to Ardsley train station)
time to reach particular location given current speed and direction (e.g., time to reach the Ardsley train station).

In addition, the current location monitor 102 can also obtain the current location-related information concerning a specified user. In one embodiment of the present disclosure, this information is retrieved by the current location monitor 102 from one or more web services accessed via the network 120, such as iPhone™ LoJack™, which returns the current location (including longitude and latitude) of a given iPhone™. Given such location information, the current location monitor 102 can respond to queries regarding another user's current location.

A current time period monitor 104 keeps track of the current time and date. The current time period monitor 104 may receive time information remotely from a global positioning system (GPS), or may be a clock component internal to the action generating device to which the timer 104 is coupled, or another. In one aspect, the current time period monitor 104 may be part of the global positioning system (GPS) receiver that is capable of receiving the location information as well as the current time information. In addition to this time and date information, the current time period monitor 104 can also check whether it is now within a given time category, such as "week day," "work hours," and "holiday." The current time period monitor 104 may accomplish this by consulting a web accessible calendar and comparing the current time and date to the scheduled events in the calendar. Note that this calendar can either be that of the owner of the action generating device 100, or another user, i.e., one specified in a time period-related specification. So, for example, if it is currently December 25, then when the given user's calendar is consulted, the date will match a "holiday." Similar to the current location monitor 102, the current time period monitor 104 may be invoked by the parametric analyzer 106 to determine if the current time period-based specification holds.

A parametric analyzer 106 analyzes the current location information and the current time information obtained in the current location monitor 102 and the current time period monitor 104, and the location-related specification and the time period-related specification obtained in the target receiver 112. The analyzer 106 provides a notification to a user as to whether the current location information and the current time information satisfy the location-related specification and the associated time period-related specification obtained in the target receiver 112.

In one aspect, the notification may include a specific type of alarm or alert, for example, as specified via the target receiver 112 as described above. The notification (or the actual alert) may be invoked by the parametric analyzer 106. In another embodiment, an additional alert generator invoked by the parametric analyzer 106 may produce the alert.

As described above, the current location may be the current location of the action generating device 100 and/or a user or users, for example, a user who is schedule to be at a specified location at a specified time, or another user. The current location as described above may be obtained from one or more of, or combinations of, a GPS, an internet service, a location from a transporter, or other devices.

A location-related specification may describe for example a destination location where a user is scheduled to be at a specified time. In another aspect, the location-related specification may include one or more of, or combinations of, a second user location, a second mobile user location, a stationary location, a movable object such as a transportation vehicle. A second user refers to another user.

Time period-related information may be expressed as the time or time range of when the user is scheduled to be at the location specified in the location-related specification. Examples of a time period-related information may include, but are not limited to, one or more of an instant in time, an estimated time, a duration of time, a time period before an instant in time, a time period after an event, a time period before an event, a time period that is triggered by a proximity to one or more of the user locations, a time period triggered by a proximity to one or more of the target locations, a proximity of the location of one user to another of one or more user, or combinations thereof.

In another aspect, other information (also referred to as parameters) may be used to calculate whether the location-related specification and the time period-related specification are satisfied. For instance, if it is known that a person is on a train and the train is at the track location where it will take the train 10 minutes to reach the target location specified in the location-related information, and that 10 minutes is within the target time specified in the time period-related specification, the system of the present disclosure may determine that the location-related specification and the time period-related specification are satisfied.

Yet in another aspect, the target receiver 102 may further include direction information.

An action generating device 100 may also include a mapping function that provides a map, for example, that displays the target location specified in the location-related specification, current locations of one or more users, or combinations thereof. An action generating device 100 may include a functionality that provides a map including a path between two or more users and/or between a user(s) and a target location(s).

A notification to a user in response to determining whether the current location information and the current time information satisfy the location-related specification and the associated time period-related specification may further include a travel time calculator that provides information associated with, time to destination, i.e., the time it is estimated to take to reach a location. The time to destination may include one or more of: a time for one or more of the users to arrive at one or more of the target locations, a time for one or more of the users to arrive at another user's location, a time for two or more of the users to arrive along one or more paths, or combinations thereof.

Yet in another aspect, if the time to destination exceeds a time limit, a second event may be triggered. The second event may include one or more of: rescheduling a meeting, re-making an appointment, or combinations thereof.

An action generating device 100 may include a processor 108 that can execute machine instructions, a memory device 110 that may hold instruction and data, and network adapter and connection, that may include the capability for wireless and/or wired communications over, e.g., the Internet, local area network (LAN), wide area network (WAN) and others. The action generating device may also include an audio device for sounding an alarm, a display device for displaying the notification, maps, and other information.

An action generating device 100 may be implemented as part of a cellular phone, a smart phone, a personal digital assistant. In another aspect, an action generating device may be a standalone device including the components and functionalities described herein.

Figure 2:
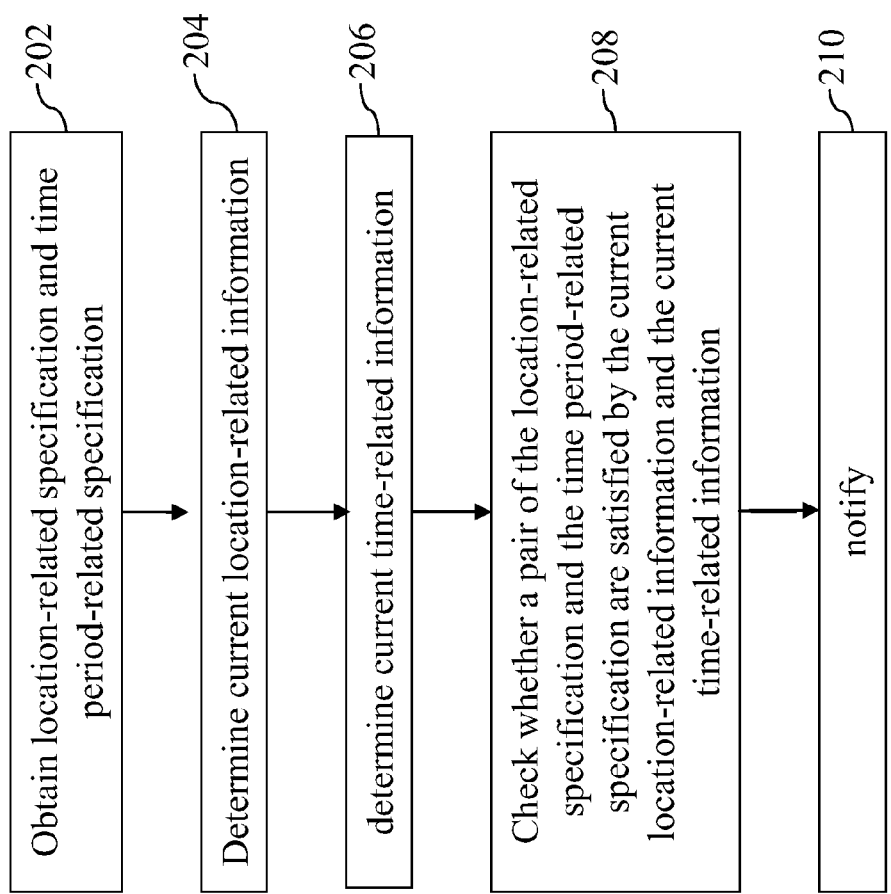
FIG. 2 is a flow diagram that illustrates an action generating method of the present disclosure in one embodiment.

FIG. 2 is a flow diagram that illustrates an action generating method of the present disclosure in one embodiment. At 202, a location-related specification and a time period-related specification are received or obtained. The time period-related specification specifies time period in which to check for the location-related specification. The time period-related specification may be received from a remote computer, for example, via a network connection, by a user input on the device, and/or from another software running on the device. For instance, the time period-related specification may be obtained from a user's calendar or the like stored on the action generating device. A drag and drop action on a calendar user interface may extract the time period-related information and include that information as the time period-related specification into a device of the present disclosure in one embodiment. For instance, a user may have calendar software opened in a window and the target receiver's interface opened in another window on a display 116. A drag action from the calendar software window into the target receiver's interface window may record into the target receiver the time period-related specification. An example would be "a meeting on X date at Y time."

In addition, the calendar may also include information as to where the meeting would take place and with whom (e.g., "at location Z with participant P"). In such a case, the meeting location and the identifier(s) of other participant(s) of the meeting would be recorded as a location-related specification associated with (or paired with) the above time period-related specification. Thus, all this information may be input to the target receiver 112 automatically from the data found in the user's calendar. Of course, other input modes are possible, e.g., a user may manually input the information into target receiver 112, the target receiver 112 may prompt for information, the target receiver 112 may automatically receive such information from a remote computer or network, etc. The device of the present disclosure would check whether on X date at Y time, the user (owner) of the calendar as well as the other persons/participants who are to be part of the meeting are positioned at the location (or near the location) to be able to make that meeting, and notify the user accordingly.

Generally, in one embodiment, the time period-related specification may include one or more of: an instant in time, an estimated time, a duration of time, a time period before an instant in time, a time period after an event, a time period before an event, a time period that is triggered by a proximity to one or more user locations, a time period triggered by a proximity to one or more target locations, a proximity of the location of one user to another of one or more user, or combinations thereof.

At 204, current location-related information is determined, for instance, by receiving information from a GPS, the Internet, or others or combinations thereof. The current location-related information may include the current location of the action generating device or one or more users of the device, and/or one or more users/persons whose identifier(s) is recorded in the location-related specification.

At 206, current time-related information is determined. The current time-related information is the current time, which may be expressed in a number of ways. For example, as an exact date and time, as to whether it is a weekend, as to whether it is a holiday, as to whether the current time falls into a range of dates and/or time, as to whether the current time falls into a specified time period (e.g., seasons, school year, etc.), and others.

At 208, it is determined whether a pair of the location-related specification and the time period-related specification is satisfied by the current location-related information and the current time-related information. For example, in the above example where the pair of location-related specification and the time period-related specification may be "at location Z with participant P" and "meeting on X date at Y time", it is determined whether the current location-related information of the user (owner) of the device, and the participant, and the current time-related information match those of "location Z" and "X date and Y time".

At 210, a notification is generated in response to determining that the pair of the location-related specification and the time period-related specification is satisfied by the current location-related information and the current time-related information. In one aspect, different types of notification may be generated, e.g., an alert or alarm sound, vibration, a verbal announcement, and/or others.

As a result, in one aspect, even if the calendar user's meeting data/time is reached, if one or more specified participants are not able to make the meeting (e.g., as discovered automatically the device of the present disclosure), the user may not receive a reminder notice of for that meeting. Additional setup may indicate which participants must be present in the meeting for the meeting to take place and which participants may optionally be in the meeting. In such a setup, even if not all participants could make the meeting, the methodology of the present disclosure in one embodiment may still generate a notification so long as those who are required to be in the meeting can make it. Other setups and options may be considered.

Further, depending on where the participants to the meeting are position, (e.g., if not at "location Z") at the time of checking, additional information may be provided. For example, the time or distance for one or more participants to reach that location, whether all participants can make the meeting (e.g., based on their current location), and/or other.

As another example, the method and/or device of the present disclosure in one embodiment may be used to selectively alert a user (or selectively turn on alerts on devices) in a group of users (or devices) in collaboration for acting on an action item. For instance, consider an example in which an errand needs to be run for a group of people and anyone in the group may run the errand. The method and/or device of the present disclosure may automatically determine the location of each person in the group at or near the time the errand needs to be performed, select and notify only one person who is geographically closest to the site of the errand. The rest of the group need not be notified or may be notified that the selected person will be performing that particular errand. An example is made of picking up food at a restaurant. Family members agree to pick up a takeout ordered at restaurant Y for dinner at home at time X. The members of the family may each carry a device of the present disclosure. Each device would include a location-related specification and a time-period related specification associated with the food takeout, e.g., geographic location of restaurant Y and time X. The device would monitor the current time and current location and also the current location(s) of other members in the family. Near the time of the pickup (e.g., time X), the device would determine who would be the most appropriate person to pickup the food from restaurant Y, for instance, by computing the distance or time it would take to get to restaurant Y by each member of the family. A notification or alert will be generated on the device carried by the person who is determined to be the appropriate person to pickup the food. The devices carried by other members of the family, may or may not be notified. For example, no alert needs to be generated on those devices since they need not pickup the food. In another embodiment, a notification that person Z will be picking up the food may be generated on those other devices. In the above scenario, each person in the group need not carry the device of the present disclosure. Rather, one person carrying the device may perform the above-described algorithm, then determine the appropriate person, so long as the device can receive the information about the locations of others and has a mechanism to alert those persons, for example, by contacting them by text-messaging, email, phone calls (e.g., by cell phones), and others.

Yet in another aspect, one or more restaurants also may be included in the collaboration group. Thus, a restaurant may also employ the device and/or method of the present disclosure in one embodiment. In this case, the device and/or method employed in the restaurant may generate a calendar event (e.g., pickup food at time X at restaurant Y's location) dynamically (e.g., when the food is ready for pickup) and distribute the calendar event automatically to the rest of the devices in the group. The rest of the devices monitor this calendar event with the current time and location as described above and alert the most appropriate person (device) in the group.

It should be understood that the above scenario is given only as an example, and the method and/or device of the present disclosure may be applicable in many different ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. An action generating device, comprising:
a target receiver operable to receive a location-related specification and a time period-related specification, the time period-related specification specifying time period in which to check for the location-related specification;
a location monitor operable to determine current location-related information;
a time period monitor operable to determine current time-related information; and
an analyzer operable to determine whether a pair of the location-related specification and the time-period related specification is satisfied by the current-location information and the current time-related information, the analyzer further operable to provide notification as to whether the pair of the location-related specification and the time-period related specification is satisfied by the current-location information and the current time-related information,
wherein the location-related specification comprises a target location and an identifier of a second user different from a first user associated with the action generating device,
wherein the notification is provided to the first user further based on the second user being at the target location.

2. The device of claim 1, wherein the location monitor returns current location of the second user.

3. The device of claim 1, wherein the time-period related specification includes one or more of: an instant in time, an estimated time, a duration of time, a time period before an instant in time, a time period after an event, a time period before an event, a time period that is triggered by a proximity to one or more user locations, a time period triggered by a proximity to one or more target locations, a proximity of location of one user to another of one or more user, or combinations thereof.

4. The device of claim 1, wherein the current location-related information include one or more of: a first user location, a remote user location, or combinations thereof.

5. The device of claim 1, wherein the current location-related information is provided by one or more of: a global positioning system, an internet service, a location from a transporter, or combinations thereof.

6. The device of claim 1, wherein the location-related specification comprises one or more of: a user location associated with the second user, a mobile user location associated with the second user, a stationary location, a movable object, or combinations thereof.

7. The device of claim 1, wherein the target receiver further obtains direction information and the direction information.

8. The device of claim 1, further comprising a mapping function.

9. The device of claim 8, further including providing a map that includes a path between two or more users, or one or more users and one or more locations specified in the location-related specification, or combinations thereof.

10. The device of claim 1, wherein the notification further includes a travel time calculator that provides information associated with time to destination.

11. The device of claim 10, wherein the time to destination includes one or more of: a time for one or more of users to arrive at one or more of locations specified in the location-related specification, a time for one or more users to arrive at another user's location, a time for two or more users to arrive along one or more paths, or combinations thereof.

12. The device of claim 10, wherein if the time to destination exceeds a time limit, a second event is triggered.

13. The device of claim 12, wherein the second event includes one or more of: rescheduling a meeting, re-making an appointment, or combinations thereof.

14. The device of claim 1, wherein the location monitor includes a global positioning device, a device operable to receive location information, or combinations thereof.

15. The device of claim 1, wherein the location-related specification includes one or more parameters that can be used to calculate location information.

16. The device of claim 1, wherein the target receiver further receives alert-specification specifying one or more alerts to generate in response to determining that a pair of location-related specification and time-period related specification is satisfied by the current-location information and the current time-related information.

17. A computer readable storage medium storing a program of instructions executable by a machine to perform a method for generating an action, the method comprising:

receiving a location-related specification and a time period-related specification, the time period-related specification specifying time period in which to check for the location-related specification;

determining current location-related information;

determining current time-related information;

determining whether a pair of the location-related specification and the time period-related specification is satisfied by the current location-related information and the current time-related information; and generating a notification in response to determining that the pair of the location-related specification and the time period-related specification is satisfied by the current location-related information and the current time-related information, wherein the location-related specification comprises a target location and an identifier of a second user different from a first user receiving the notification, wherein the notification is provided to the first user further based on the second user being at the target location.

18. The computer readable storage medium of claim 17, further including providing a mapping function.

19. The computer readable storage medium of claim 18, wherein if the time to destination exceeds a time limit, a second event is triggered.

* * * * *